US012803382B2

(12) United States Patent
Säkkinen et al.

(10) Patent No.: US 12,803,382 B2
(45) Date of Patent: Nov. 17, 2026

(54) APPARATUS AND METHOD FOR COOLING

(71) Applicant: ABB Schweiz AG, Baden (CH)

(72) Inventors: Petri Säkkinen, Helsinki (FI); Janne Pohjalainen, Helsinki (FI); Juha Sippola, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 205 days.

(21) Appl. No.: 18/751,456

(22) Filed: Jun. 24, 2024

(65) Prior Publication Data

US 2025/0007354 A1 Jan. 2, 2025

(30) Foreign Application Priority Data

Jun. 30, 2023 (EP) .................................... 23182600

(51) Int. Cl.
*H02K 9/08* (2006.01)
*B63H 21/17* (2006.01)

(52) U.S. Cl.
CPC ............... *H02K 9/08* (2013.01); *B63H 21/17* (2013.01)

(58) Field of Classification Search
CPC . B63H 21/17; H02K 9/08; H02K 9/10; H02K 9/12; H02K 9/14
USPC ......................................... 310/52, 54, 58, 64
See application file for complete search history.

(56) References Cited

U.S. PATENT DOCUMENTS 4,246,503 A * 1/1981 Fujioka .................... H02K 9/10 310/59
5,866,959 A 2/1999 Le Flem
6,164,084 A * 12/2000 Watson .................. H02K 5/207 310/60 R
6,700,235 B1 * 3/2004 McAfee ................... H02K 9/06 310/58
2004/0052049 A1 * 3/2004 Wu ..................... F28D 15/0266 257/E23.098
2007/0063594 A1 3/2007 Huynh
2014/0175919 A1 * 6/2014 Miyamoto ............... H02K 9/08 310/59
2020/0271130 A1 * 8/2020 Miyata ................ F04D 29/5826
2021/0006131 A1 1/2021 Kawanishi
2021/0388840 A1 * 12/2021 Sakaguchi ............ F04D 19/046
2022/0009608 A1 * 1/2022 Maksimainen .......... B63H 5/03
2022/0048607 A1 * 2/2022 Peljo ...................... F16C 33/72
(Continued)

FOREIGN PATENT DOCUMENTS

DE 19919040 A1 9/2000
DE 10307813 B4 5/2006
(Continued)

OTHER PUBLICATIONS

Japanese First Office Action; Application No. 2024-104651; Mailing Date: Jul. 8, 2025; 13 Pages.
(Continued)

*Primary Examiner* — Rashad H Johnson
(74) *Attorney, Agent, or Firm* — Greenberg Traurig, LLP

(57) ABSTRACT

An apparatus and a method for cooling an electric motor. To obtain simple and sufficient cooling the electric motor is provided with a dual cooling system including a cooling space provided to the stator for receiving and passing on a cooling fluid which cools the stator, and an inlet and an outlet provided to the electric motor for receiving and passing on a cooling gas flow which cools at least the rotor before exiting the electric motor.

14 Claims, 3 Drawing Sheets

(56) References Cited

U.S. PATENT DOCUMENTS

| | | | | |
|---|---|---|---|---|
| 2023/0040452 | A1 * | 2/2023 | Renotte | H02K 9/14 |
| 2024/0011495 | A1 * | 1/2024 | Miwata | F04D 29/584 |
| 2025/0007354 | A1 * | 1/2025 | Säkkinen | H02K 5/203 |

FOREIGN PATENT DOCUMENTS

| | | | |
|---|---|---|---|
| JP | 56102946 | U | 8/1981 |
| JP | 55001497 | B2 | 5/2014 |
| JP | 2014140288 | A | 7/2014 |
| JP | 2019161764 | A | 9/2019 |
| JP | 2022042514 | A | 3/2022 |
| JP | 73022565 | B2 | 8/2023 |

OTHER PUBLICATIONS

Extended European Search Report; Application No. EP 23182600.9; Completed: Nov. 28, 2023; Mailing Date: Dec. 7, 2023; 10 Pages.

* cited by examiner

APPARATUS AND METHOD FOR COOLING

TECHNICAL FIELD

This invention relates to a solution for cooling an electric motor. In the following the invention will by way of example be explained by referring to an electric motor of a cycloidal propulsion unit, though the cooling method can be utilized also for other electric motors.

BACKGROUND

A problem with electric motors, such as with electric motors of a cycloidal propulsion unit, is to provide sufficient cooling to various parts of the electric motor. Sufficient cooling is essential, because the loading of an electric motor can be increased if a temperature rise can be avoided. Therefore, more power will be available from the electric motor without a need to increase the motor diameter or length if the cooling is efficient.

SUMMARY

An object of the present invention is to provide a solution ensuring efficient cooling for an electric motor. This object is achieved with the apparatus of independent claim 1 and the method of independent claim 14.

An efficient dual cooling to an electric motor can be obtained by circulating a cooling fluid to the stator, and by cooling other components of the electric motor with a cooling gas flow, which from an inlet enters the electric motor and flows along a rotor before exiting the electric motor via an outlet. Such a solution ensures that the cooling is sufficiently efficient to ensure that a significant amount of power is available from the electric motor without a need to increase the size of the electric motor.

Preferred embodiments of the invention are disclosed in the dependent claims.

BRIEF DESCRIPTION OF DRAWINGS

In the following apparatus and method will be described in closer detail by way of example and with reference to the attached drawings, in which.

DETAILED DESCRIPTION

Figure 1:
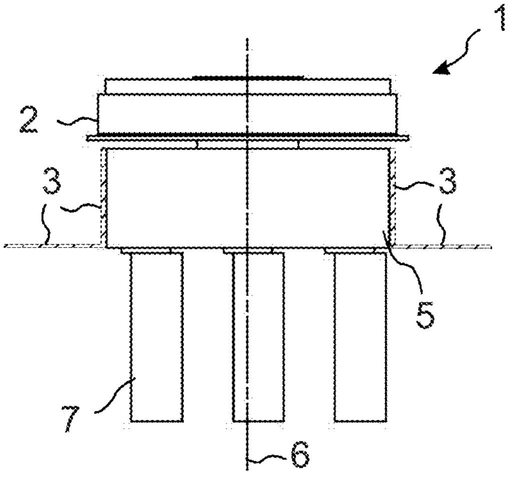
FIGS. 1 to 3 illustrate an electric motor installed in a cycloidal propulsion unit.
Figure 2:
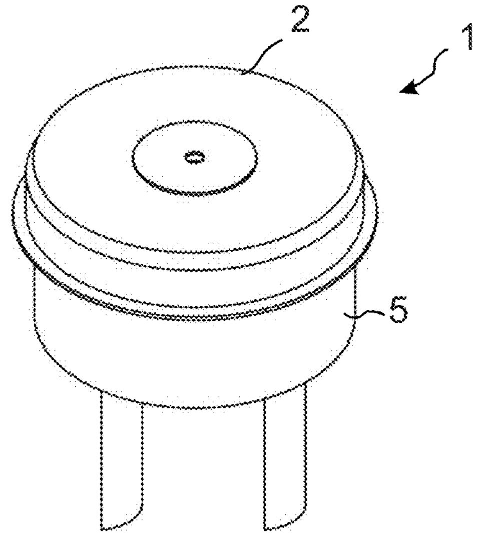
Figure 3:
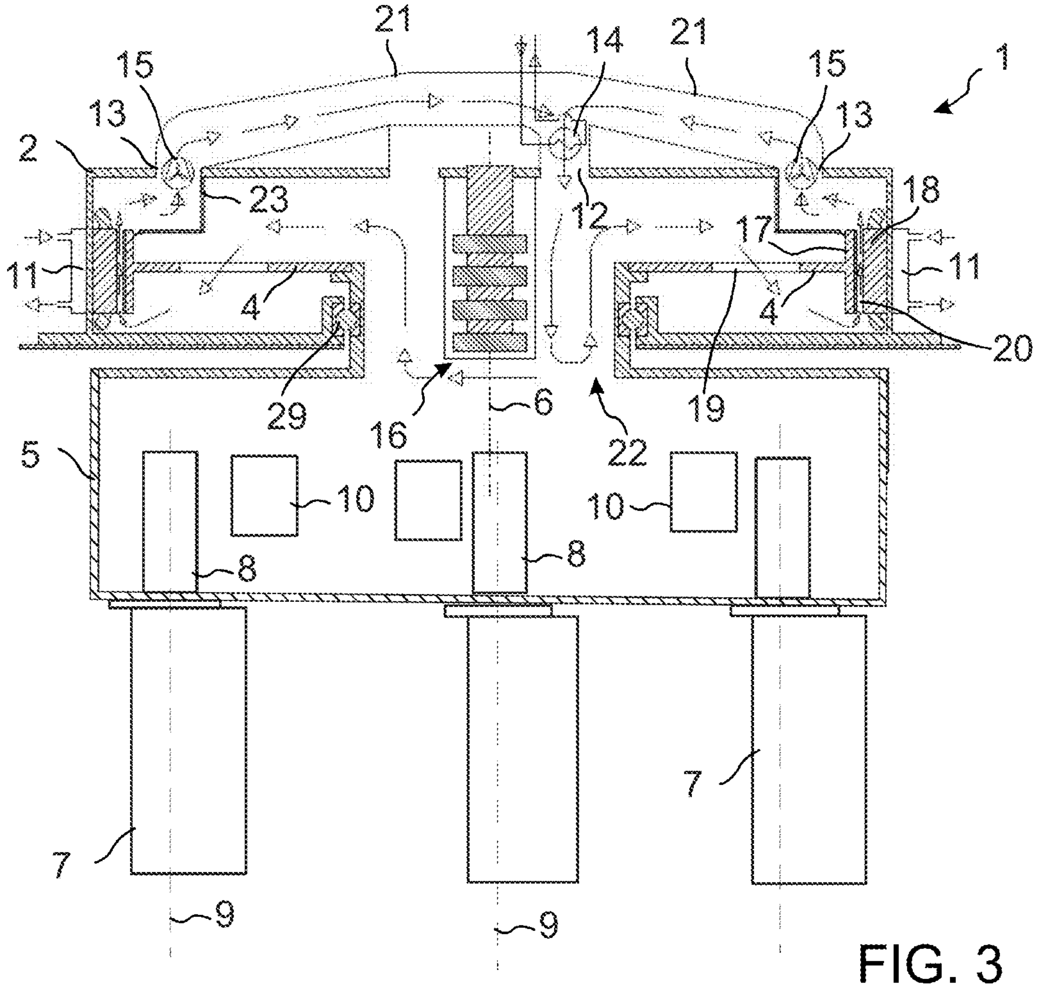

FIGS. 1 to 3 illustrate an electric motor installed in a cycloidal propulsion unit as seen from the side in FIG. 1, from above in FIG. 2 and in cross-section with cooling devices added in FIG. 3.

The electric motor comprises a stator 2 which in this case is stationary installed within a hull 3 of a ship. A rotor 4 is rotatably arranged within the stator 2. The rotor 4 continues downwards as a rotary casing 5, which together with the rotor 4 rotates around a rotation axis 6 during operation. When the electric motor is installed in a cycloidal propulsion unit, the rotation axis is in praxis vertically oriented.

A lover part of the hollow rotary casing 5 is provided with blades 7, which are located in the water outside of the hull 3 and which together with the rotary casing rotate around the rotation axis 6. Each blade is additionally provided with a drive mechanism 8 which rotates a blade 7 separately in relation to the rotary casing 5 around a rotation axis 9. Due to the blade 7 specific drive mechanisms 8, each blade can be separately controlled to rotate in an optimal way. This makes it possible to drive and operate the ship as needed with the cycloidal propulsion unit. Consequently, the electric motor illustrated may be the main motor of the ship. The drive mechanisms may be implemented with suitable mechanical devices, such as gears and shafts, for instance. However, in the following explanation it will by way of example be assumed that the drive mechanisms 8 include electric motors driven by motor drives 10, such as frequency converters. Consequently, one electric motor for each blade 7. The motor drives 10 may be installed within the rotary casing 5, for instance.

A challenge with an electric motor 1 of the illustrated type is cooling. In the illustrated example, a hybrid cooling solution is used to cool the electric motor 1. This hybrid cooling solution includes a cooling space 11 provided to the stator 2 for receiving and passing on a cooling fluid which cools the stator. In addition, the electric motor 1 is provided with an inlet 12 and an outlet 13 for receiving and passing on a cooling gas flow within the stator casing of the electric motor to cool at least the rotor 4. For simplicity, the inlet, outlets, fans, heat exchanger and cooling space are not illustrated in FIGS. 1 and 2.

The cooling space 11 through which a cooling fluid, such as water, circulates may be implemented as cooling jacket, for instance. In that case the cooling space 11 may be implemented as a relatively high-volume annular container surrounding at least a part of the stator 2. Alternatively, depending on the implementation, the cooling space may be implemented as one or more pipes partly surrounding the stator. The cooling space may be implemented as a separate part surrounding and contacting the outer surface of the stator, or alternatively, as a part integrated into the outer walls of the stator casing. If integrated into the outer walls, the walls of the stator are at least partly hollow.

In FIG. 3 it is by way of example assumed that a heat exchanger 14 is arranged to cool the gas flow, such as air flow, entering the electric motor 1 via the inlet 12. Preferably, this heat exchanger is at least partially embedded into the illustrated electric motor. This ensures a space saving compact design.

A heat exchanger is, however, not necessary in all embodiments. In FIG. 3 the heat exchanger is connected to a fluid circulation where cold fluid is used to cool the gas entering the electric motor 1. This gas flow circulates within the electric motor 1 where it comes into contact with at least the rotor 2 before exiting the electric motor via the outlet 13. In the illustrated example two outlets have been provided by way of example, though in some implementations one outlet may be sufficient. It is also illustrated by way of example in FIG. 3 that both outlets 13 are provided with a fan 15, such as a centrifugal fan, though only one fan may be sufficient. In some implementations a fan may not be needed at all, if the fluid flow may be generated somewhere else, such as by ventilation system of a building or a ship which is able to generate the gas flow needed for cooling. If a fan is included, this fan is preferably also at least partly embedded into the illustrated electric motor to provide a compact design.

In FIG. 3 a closed loop for circulating the gas flow from the outlets 13 to the inlet 12 has been implemented by means of duct 21 which feeds the heated air flow from the outlets 13 via the heat exchanger 14 back into the electric motor 1. In addition to cooling the rotor 2, the gas flow may also cool the slip ring unit 16, the magnets 17 of the rotor and windings 18 of the stator 2. The main bearing 29, which rotatably supports the rotor and the rotary casing 5, is additionally to some extent cooled by means of the gas flow, though the main bearing may additionally be provided with a feed of lubrication, which also cools the main bearing.

Efficient cooling of the magnets and windings is obtained in FIG. 3 by conducting the gas flow through the rotor 4 via at least one opening 19. This opening is located between the magnets 17 and the rotation axis 6. Additionally, the gas flow is conducted through an annular gap 20 formed along an outer periphery of the rotor 4. This annular gap is shown in FIG. 3 between the magnets 17 of the rotor 4 and the windings 18 of the stator 2. To ensure that the gas flow passes through the at least one opening 19 and the annular gap 20, a wall 23 has been provided to extend from a position in close proximity of the outer periphery of the rotor 4 to an upper wall part of the motor. This wall 23 prevents the gas flow from passing directly from the inlet to the outlet without flowing through the rotor 4 and the annular gap 20.

In case another type of electric motor is utilized in the embodiment of FIGS. 1-3 or in the other embodiments, such as a induction motor with a wound type or squirrel-cage type induction rotor, no magnets are needed in the rotor. Also, in that case it is advantageous to conduct the gas flow through the annular gap 20 formed along the outer periphery of the rotor 4, as the gas flow will in that case cool the wound or squirrel-cage of the rotor.

When the electric motor 1 is used in a cycloidal propulsion unit with a rotary casing comprising drive mechanisms 8 for the blades, it is advantageous to conduct the air flow also through the rotary casing 5, as illustrated in FIG. 3. This makes it possible to ensure that the temperature in the space where the drive mechanisms are installed remains sufficiently low. In some installations, the drive mechanisms 8 may additionally be cooled by a separate cooling fluid (not illustrated). However, also in that case it is advantageous to ensure that the temperature in the inner space of the rotary casing 5 is at an acceptable level by means of the cooling gas flow, as it will be easier for the fluid cooling to keep the most critical components in the rotary casing at an adequate temperature.

In FIG. 3 an opening 22 through the rotor 4 is provided in proximity of the rotation axis 6. This opening 22 facilitates gas flow from above, through the rotor 4 into the rotary casing 5 and back. This opening 22 may be very large to facilitate that maintenance personnel can enter the rotary casing 5 for service purposes via this opening 22.

In FIG. 3 the inlet 12 is located close to the rotation axis 6, while the outlet or outlets 13 are located closer to the outer periphery of the rotor 4. One advantage with this is that the cooled gas flow entering the electric motor via the heat exchanger 14 close to the rotation axis 6 keeps the ambient temperature of the slip ring unit 16 and blade 7 drive mechanisms 8 lower. In some installations the direction of the gas flow may, however, be opposite with one or more inlets at the periphery of the rotor and one or more outlets close to the rotation axis.

In FIG. 3 the heat exchanger 14 is located in the flow direction after the fan or fans 15. This is, however, only by way of examples. In other implementations the heat exchanger 14 may be located in the flow direction before the fan or fans 15. Still in some other implementations the gas flow may be such arranged that the gas is feed to an outer circulation on top of the electric motor and it flows downwards into the electric motor through the air gap 20 in the opposite direction compared to FIG. 3.

Figure 4:
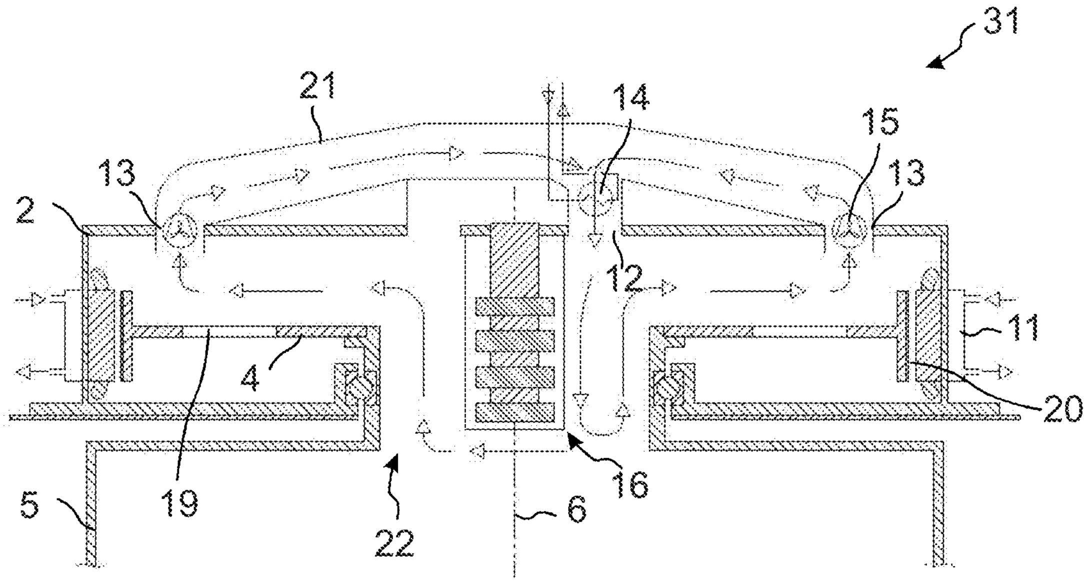
FIG. 4 illustrates a second embodiment of an electric motor.

FIG. 4 illustrates a second embodiment of an electric motor 31. The embodiment of FIG. 4 is very similar to the first embodiment explained in connection with FIGS. 1-3. Therefore, in the following, the embodiment of FIG. 4 is mainly explained by pointing out the differences between these embodiments.

In FIG. 4 the gas flow from the inlet 12 to the outlet 13 is conducted differently. The wall 23 shown in FIG. 3 is missing in FIG. 4. Due to this there is nothing forcing the gas flow to pass via the openings 19 (if provided) and annular gap 20 of the rotor 4. Instead, the gas flow passes from the space above the rotor 4 to the space below the rotor along the slip ring unit 16 in proximity of the rotation axis 6 via the opening 22. However, if airflow through the openings 19 to the space below the rotor 4 is preferred, this may be in some implementations be obtained by reversing the flow direction and by locating openings 13 above openings 19. In that case the gas flow enters the electric motor via the openings 13 and a part of the gas flow continues via openings 19 to the space below the rotor 4.

If the electric motor 31 is used in a cycloidal propulsion unit, the rotary casing 5 and the devices located inside the rotary casing may be similar as has been explained in connection with FIG. 3. For simplicity, only the upper part of the rotary casing is shown in FIG. 4, though also in this second embodiment the gas flow may reach devices installed in the rotary casing 5 and provide cooling to them.

Figure 5:
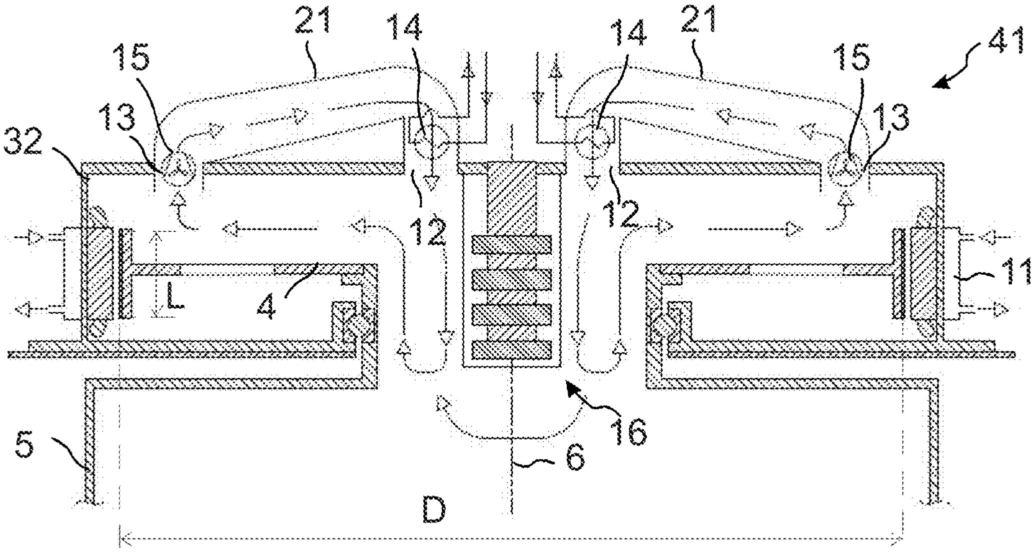
FIG. 5 illustrates a third embodiment of an electric motor.

FIG. 5 illustrates a third embodiment of an electric motor. FIG. 5 is very similar as the first embodiment explained in connection with FIGS. 1-3 and the second embodiment explained in connection with FIG. 4. Therefore, in the following, the embodiment of FIG. 5 is mainly explained by pointing out the differences between these embodiments.

In FIG. 5 the electric motor 41 is provided with two inlets 12 and also two heat exchangers 14 providing cooled gas flows into the electric motor 41. Additionally, to provide a closed circulation, two ducts 21 are provided to pass on the gas flow exiting the outlets 13 to the respective inlets 12. An advantage with such a solution, which can be utilized also in the previously explained embodiments, is that the cooling capacity is increased. Consequently, a larger amount of cooling gas with a suitable temperature can be provided into the stator of the electric motor 41, as compared to the solutions illustrated in FIGS. 3 and 4. Additionally, with such a solution the system becomes more redundant in case of a failure, such as in case of a fan motor failure. It also becomes possible to use smaller components (fans and/or heat exchangers) which saves space.

As can be seen from FIG. 5, the rotor 4 has a diameter D which is larger than the length L of the rotor in the direction of the rotation axis 6. This may also apply to all the other embodiments.

If the electric motor 41 is used in a cycloidal propulsion unit, the rotary casing 5 and the devices located inside the rotary casing may be similar as has been explained in connection with FIG. 3. For simplicity, only the upper part of the rotary casing is shown in FIG. 5, though also in this second embodiment the gas flow may reach devices installed in the rotary casing 5 and provide cooling to them.

Figure 6:
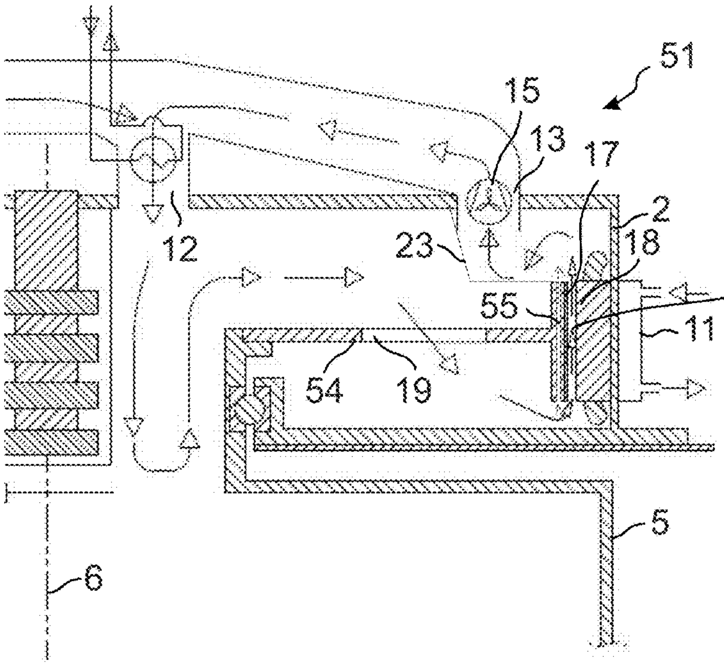
FIGS. 6 and 7 illustrates a fourth embodiment of an electric motor.
Figure 7:
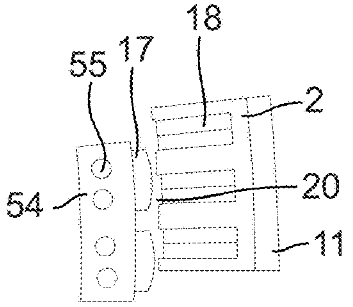

FIGS. 6 and 7 illustrate a fourth embodiment of an electric motor.

The embodiment of FIGS. 6 and 7 is very similar to the first embodiment explained in connection with FIGS. 1-3.

Therefore, in the following, the embodiment of FIGS. 6 and 7 is mainly explained by pointing out the differences between these embodiments.

In FIG. 6 only the upper right part of the electric motor is illustrated to provide an enlarged view of the area around the annular gap 20 between the rotor 54 magnets 17 and the stator 2 windings 18. FIG. 7 illustrates an enlarged view of the same area as seen from above.

Similarly, as in the embodiment of FIG. 3, also in FIGS. 6 and 7 the cooling gas flow passes the annular gap 20 between the rotor 54 and the stator 2 windings 18. However, to still improve cooling of the rotor, the rotor 54 is provided with holes 55 along an outer periphery of the rotor 54. In praxis these holes 55 may form channels extending in a direction which is parallel or substantially parallel to the direction of the rotation axis 6.

In FIGS. 6 and 7 it is by way of example assumed that electric motor is of a type where the rotor 54 is provided with magnets 17. In that that case the holes 55 or channels are provided through the rotor at the magnets 17. In praxis these holes 55 are provided in close proximity to the magnets, between the magnets 17 and the openings 19. With such a solution, a cooling flow which flows in the direction of the rotation axis 6 is obtained on two sides of the magnets 17, via the annular gap 20 and via the holes 55 at the magnets. This makes the cooling much more efficient.

However, in case the electric motor is of a type where the rotor is not provided with magnets, such as in case of an induction motor, it is still beneficial to have the illustrated holes 55 close to the outer periphery of the rotor 54 to provide a cooling flow through the holes 55 in the direction of the rotation axis 6. In that case the holes 55 may be as close as possible to the squirrel-cage of the induction motor, for instance. In particular for low price induction motors, the thermal losses are significant and efficient cooling is required. This can be achieved with the structure illustrated in FIGS. 6 and 7 having the combination of the holes 55 in the rotor 52 and the annular gap between the rotor 54 and the stator 2. It may be beneficial to maximize the surface area of the holes by having the holes in two circles in close proximity to the squirrel-cage of the induction motor.

Figure 8:
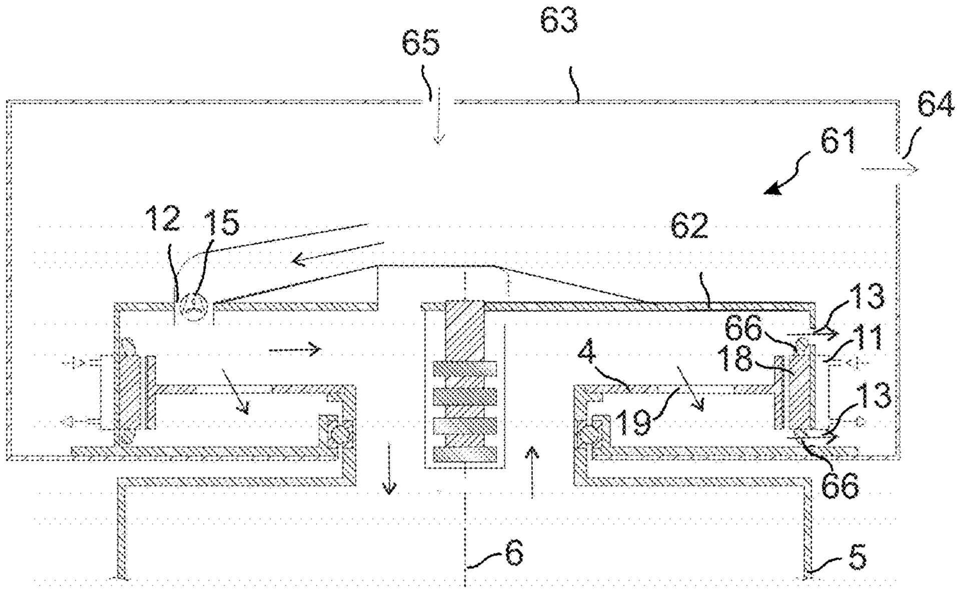
FIG. 8 illustrates a fifth embodiment of an electric motor.

FIG. 8 illustrates a fifth embodiment of an electric motor. The embodiment of FIG. 8 is very similar to the one explained in connection with FIGS. 1-3. Therefore, in the following, the embodiment of FIG. 8 is mainly explained by pointing out the differences between these embodiments.

In FIG. 8 the electric motor 61 is installed in an enclosed room 63 (or space) of a ship or a building for instance. The room 63 is connected to a ventilation system of the ship or building via an outlet 64 and an inlet 65. A separate heat exchanger is therefore not needed at the electric motor to cool the gas flow, which is passed into the electric motor 61, as such a heat exchanger cooling the gas flow is provided to the ventilation system. One advantage of such a solution is that it saves space. In a cycloidal propulsion unit, for instance, this may be a significant advantage.

In FIG. 8 it is by way of example assumed that the electric motor 61 is provided with a fan 15 generating a gas flow into the electric motor 61. However, this fan can be eliminated in case the air flow from the inlet 65 to the room provides a sufficiently strong air flow and this inlet 65 can be directly connected to the inlet 12 of the electric motor 61.

In FIG. 8 the outlets 13 from the stator 62 are not provided in the upper part of the stator, but instead in the side of the stator. In this case two outlets are provided. A first outlet is provided directly below the stator windings 18 and a second outlet is provided directly above the stator windings 18. In this way the ends 66 of the stator windings will also be efficiently cooled. Due to the location of the lower outlet 13 below the stator winding 18, the gas flow will enter through the opening 19 into the space below the rotor 4. In some implementations it may be advantageous to have several outlets 13 in a row or rows around the side of the stator. In that case, this row or rows of outlets in the motor casing may be aligned with winding ends on both ends of the electric motor.

In FIG. 8 outlets 13 are arranged in close proximity to the cooling space 11 which is provided with a cooling fluid circulation to cool the stator 62. This makes it possible to provide cooling fins (not illustrated) to extend from the cooling space 11 into the gas flow passing via the outlets 13. In this way, the gas flow can be cooled partly by means of the cooling fluid circulation of the cooling space 11. Such cooling of the gas flow can also be obtained by reversing the gas flow within the electric motor 61. In that case the inlet 12 and the outlets 13 switch places. Consequently, the gas flow entering the electric motor via the inlets at the side of the stator is cooled by fins at the cooling space 11 just before entering the electric motor.

The inlets or outlets can be provided to the side of the stator 62 as illustrated in FIG. 8 also in the previously explained embodiments. In that case the electric motor can still be provided with the previously mentioned fans and heat exchangers, as explained in the previous embodiments.

If the electric motor 61 is used in a cycloidal propulsion unit, the rotary casing 5 and the devices located inside the rotary casing may be similar as has been explained in connection with FIG. 3. For simplicity, only the upper part of the rotary casing is shown in FIG. 8, though also in this second embodiment the gas flow may reach devices installed in the rotary casing 5 and provide cooling to them.

It is to be understood that the above description and the accompanying figures are only intended to illustrate the present invention. It will be obvious to a person skilled in the art that the invention can be varied and modified without departing from the scope of the invention.

The invention claimed is:

1. An apparatus comprising:
- a cycloidal propulsion unit with an electric motor having a stator and a rotor, and
- a rotary casing arranged coaxially with the rotor to rotate with the rotor around a vertical rotation axis and as an extension to the stator,
  - wherein the rotary casing includes a drive mechanism arranged to rotate blades of the cycloidal propulsion unit which protrude outward from the rotary casing in a direction away from the rotor,
- wherein the electric motor is provided with a dual cooling system including:
  - a cooling space provided to the stator for receiving and passing on a cooling fluid which cools the stator, and
  - an inlet and an outlet provided to the electric motor for receiving and passing on a cooling gas flow which cools at least the rotor before exiting the electric motor,
    - wherein at least a part of the cooling gas flow is directed to flow from the inlet via the rotary casing to the outlet for cooling the drive mechanism.

2. The apparatus according to claim 1, wherein the apparatus comprises a fan circulating the cooling gas flow flowing from the inlet to the outlet.

3. The apparatus according to claim 1, wherein the apparatus comprises a heat exchanger through which said cooling gas flow passes, the heat exchanger receiving and passing on a cooling fluid, which in the heat exchanger cools the cooling gas flow.

4. The apparatus according to claim 1, wherein an annular gap is provided between an outer periphery of the rotor and the stator and the cooling gas flow between the inlet and the outlet is directed to pass via the annular gap.

5. The apparatus according to claim 1, wherein the gas flow is directed to flow through at least one opening in the rotor before exiting the electric motor.

6. The apparatus according to claim 1, wherein:

the rotor is provided with holes along an outer periphery of the rotor and is configured to rotate around a rotation axis, and the cooling gas flow is directed to flow between the inlet and the outlet by passing through the holes in the rotor which are provided in close proximity to the outer periphery of the rotor.

7. The apparatus according to claim 1, wherein one of the inlet and outlet is provided in proximity of the cooling space such that cooling fluid in the cooling space cools the gas flow entering or exiting the electric motor.

8. The apparatus according to claim 1, wherein the cooling space provided to the stator includes a cooling jacket at least partially surrounding the stator.

9. The apparatus according to claim 1, wherein the cooling space provided to the stator includes cooling pipes provided to the stator.

10. The apparatus according to claim 1, wherein the rotor is provided with an opening providing service personnel access to enter the rotary casing by passing through the stator.

11. The apparatus according to claim 1, wherein the rotor has a diameter which is larger than a length of the rotor in the direction of the rotation axis.

12. A method for cooling an electric motor having a stator, a rotor, and a rotary casing arranged coaxially with the rotor to rotate with the rotor around a vertical rotation axis and as an extension to the stator, and wherein the rotary casing includes a drive mechanism arranged to rotate blades of a cycloidal propulsion unit which protrude outward from the rotary casing in a direction away from the rotor, wherein the method comprises providing dual cooling by:

circulating a cooling fluid to the stator for cooling the stator, and passing on a cooling gas flow via an inlet into the electric motor, through the rotor and further out of the electric motor via an outlet, wherein at least a part of the cooling gas flow is directed to flow from the inlet via the rotary casing to the outlet for cooling the drive mechanism.

13. The method according to claim 12, wherein the cooling gas flow is directed to pass via an annular gap provided between the rotor and the stator along an outer periphery of the rotor.

14. The method according to claim 12, wherein the cooling gas flow is directed to pass via holes provided in the rotor along an outer periphery of the rotor.

* * * * *